(12) United States Patent
Hardiyanto et al.

(10) Patent No.: US 10,038,188 B2
(45) Date of Patent: Jul. 31, 2018

(54) CATHODE ACTIVE MATERIAL, PROCESS FOR ITS PRODUCTION, CATHODE AND LITHIUM ION SECONDARY BATTERY

(71) Applicant: Asahi Glass Company, Limited, Chiyoda-ku (JP)

(72) Inventors: Widjaja Hardiyanto, Chiyoda-ku (JP); Chikaya Tamitsuji, Chiyoda-ku (JP); Naoki Yoshida, Chiyoda-ku (JP); Sadatatsu Ikeda, Chiyoda-ku (JP)

(73) Assignee: SUMITOMO CHEMICAL CO., LTD., Tokyo (JP)

( * ) Notice: Subject to any disclaimer, the term of this patent is extended or adjusted under 35 U.S.C. 154(b) by 232 days.

(21) Appl. No.: 14/694,342

(22) Filed: Apr. 23, 2015

(65) Prior Publication Data
US 2015/0325851 A1 Nov. 12, 2015

(30) Foreign Application Priority Data

May 12, 2014 (JP) ................. 2014-099063
Apr. 3, 2015 (JP) ................. 2015-076969

(51) Int. Cl.
*H01M 4/36* (2006.01)
*H01M 4/505* (2010.01)
*H01M 4/525* (2010.01)
*H01M 4/583* (2010.01)
*H01M 10/052* (2010.01)
*H01M 4/02* (2006.01)

(52) U.S. Cl.
CPC ........... *H01M 4/525* (2013.01); *H01M 4/366* (2013.01); *H01M 4/505* (2013.01); *H01M 4/5835* (2013.01); *H01M 10/052* (2013.01); *H01M 2004/028* (2013.01)

(58) Field of Classification Search
CPC ...... H01M 4/366; H01M 4/505; H01M 4/525; H01M 4/5835; H01M 2004/028; H01M 10/052
See application file for complete search history.

(56) References Cited

U.S. PATENT DOCUMENTS

| | | | | |
|---|---|---|---|---|
| 2008/0311432 A1* | 12/2008 | Park | ................ | H01B 1/08 429/5 |
| 2010/0119947 A1* | 5/2010 | Lee | ................ | H01M 4/0471 429/231.95 |
| 2010/0233550 A1* | 9/2010 | Yanagida | ................ | H01M 4/364 429/338 |
| 2011/0042609 A1* | 2/2011 | Park | ................ | H01M 4/366 252/182.1 |
| 2012/0225357 A1* | 9/2012 | Jeoung | ................ | H01M 4/13 429/231.95 |
| 2013/0164624 A1* | 6/2013 | Sheem | ................ | H01M 4/587 429/231.7 |
| 2013/0236788 A1 | 9/2013 | Tsunozaki et al. | | |
| 2013/0252096 A1* | 9/2013 | Kobayakawa | ................ | H01M 4/622 429/213 |
| 2013/0318780 A1 | 12/2013 | Tsunozaki et al. | | |
| 2014/0110641 A1 | 4/2014 | Murotani et al. | | |
| 2014/0113193 A1 | 4/2014 | Tsunozaki et al. | | |
| 2014/0113194 A1 | 4/2014 | Tsunozaki et al. | | |
| 2014/0154581 A1 | 6/2014 | Kawasato et al. | | |
| 2014/0212758 A1 | 7/2014 | Kawasato et al. | | |
| 2015/0024272 A1 | 1/2015 | Tsunozaki | | |

FOREIGN PATENT DOCUMENTS

JP  2012-169217   9/2012
WO  WO 2012/171780  * 12/2012

OTHER PUBLICATIONS

Myung, S.T.; Izumi, K.; Komaba, S.; Sun, Y.K.; Yashiro, H.; Kumagai, N.—Role of Alumina Coating on Li—Ni—Co—Mn—O Particles as Positive Electrode Material for Lithium-Ion Batteries, Chem. Mater, 2005, 17, 3695-3704.*

* cited by examiner

*Primary Examiner* — Anca Eoff
(74) *Attorney, Agent, or Firm* — Oblon, McClelland, Maier & Neustadt, L.L.P.

(57) ABSTRACT

To provide a cathode active material with which a lithium ion secondary battery having favorable cycle characteristics and having a high energy density even when discharged at a high voltage can be obtained; a cathode comprising the cathode active material; and a lithium ion secondary battery having the cathode.

A cathode active material comprising a composite oxide (A) containing Li and at least one transition metal element selected from the group consisting of Ni, Co and Mn, and the following particles (B) and the following fluorinated carbon material (C) present on the surface of the composite oxide (A):

particles (B): particles containing an oxide of at least one metal element selected from the group consisting of Ti, Sn, Si, Al, Ce, Y, Zr, Co, W, V, Nb, Ta, La and Mg; and fluorinated carbon material (C): a fluorinated carbon material in the form of particles or fibers.

9 Claims, 7 Drawing Sheets

CATHODE ACTIVE MATERIAL, PROCESS FOR ITS PRODUCTION, CATHODE AND LITHIUM ION SECONDARY BATTERY

FIELD OF INVENTION

The present invention relates to a cathode active material, a process for its production, a cathode comprising the cathode active material, and a lithium ion secondary battery having the cathode.

BACKGROUND OF INVENTION

As a cathode active material contained in a cathode of a lithium ion secondary battery (hereinafter a lithium ion secondary battery will sometimes be referred to as LIB), a composite oxide of Li and a transition metal such as $LiCoO_2$, $LiNiO_2$, $LiNi_{0.8}Co_{0.2}O_2$ or $LiMnO_4$ has been used.

A LIB is required to maintain a discharge capacity and a discharge voltage even after repeating the charge and discharge cycle (hereinafter referred to as cycle characteristics), and to have a high energy per unit volume of the cathode (hereinafter referred to as an energy density). However, a conventional cathode active material cannot sufficiently meet such requirements. For example, a LIB using $LiCoO_2$ as a cathode active material can have a high initial energy density by discharging at a high voltage of 4.5 V. However, if it is charged at a high voltage, its cycle characteristics are low, and if the charge and discharge cycle is repeated, the discharge capacity and the discharge voltage are lowered. As a result, if the charge and discharge cycle is repeated, the energy density of the LIB is also extremely lowered.

As a cathode active material with which a LIB having favorable cycle characteristics even when charged at a high voltage is obtained, the following material has been proposed.

(1) A cathode active material comprising a composite oxide containing Li and at least one transition metal element selected from the group consisting of Ni, Co and Mn, and an oxide of at least one metal element selected from the group consisting of Zr, Ti and Al, and at least one carbon material selected from the group consisting of carbon nanotubes, graphene and carbon black present on the surface of the composite oxide (Patent Document 1).

However, in the case of a LIB using a cathode active material in which a metal oxide and a carbon material are present on the surface of a composite oxide, if the proportion of the cathode active material in the cathode is increased (for example, at least 90 mass %) so as to increase the energy density, the cycle characteristics are lowered. Accordingly, the proportion of the cathode active material in the cathode may not be increased and as a result, the energy density may not sufficiently be increased.

PRIOR ART DOCUMENT

Patent Document

Patent Document 1: JP-A-2012-169217

SUMMARY OF INVENTION

Technical Problem

The object of the present invention is to provide a cathode active material with which a LIB having favorable cycle characteristics and having a high energy density even when charged at a high voltage can be obtained, the cathode comprising the cathode active material, and a LIB having the cathode.

Solution to Problem

The present invention provides the following [1] to [11]

[1] A cathode active material comprising a composite oxide (A) containing Li and at least one transition metal element selected from the group consisting of Ni, Co and Mn, and the following particles (B) and the following fluorinated carbon material (C) present on the surface of the composite oxide (A):

particles (B): particles containing an oxide of at least one metal element selected from the group consisting of Ti, Sn, Si, Al, Ce, Y, Zr, Co, W, V, Nb, Ta, La and Mg; and fluorinated carbon material (C): a fluorinated carbon material in the form of particles or fibers.

[2] The cathode active material according to [1], wherein the composite oxide (A) is represented by the following formula (I):

$$LiaNi_xCo_yMn_zMe_bO_2 \quad (I)$$

wherein $0.95 \leq a \leq 1.1$, $0 \leq x \leq 1$, $0 \leq y \leq 1$, $0 \leq z \leq 1$, $0 \leq b \leq 0.3$, $0.9 \leq x+y+z+b \leq 1.05$, and Me is at least one element selected from the group consisting of Al, Mg, Fe, Cr, Mo, Cu, Zr, Ti, W, V, and Y.

[3] The cathode active material according to [1] or [2], wherein the mass of the particles (B) based on the mass of the composite oxide (A) is from 0.1 to 10%.

[4] The cathode active material according to any one of [1] to [3], wherein the mass of the fluorinated carbon material (C) based on the mass of the composite oxide (A) is from 0.1 to 10%.

[5] The cathode active material according to any one of [1] to [4], wherein the particles (B) are particles containing an oxide of at least one metal element selected from the group consisting of Ti, Sn, Al, Ce and Y.

[6] The cathode active material according to any one of [1] to [5], wherein the average particles size (2) of the following secondary particles of the particles (B) is from 2 to 100 nm, provided that the average particle size (2) is a value calculated from the surface area and the true density of the particles in accordance with the following formula:

$$\text{average particle size (2)} = 6/(\rho \cdot Sw)$$

wherein $\rho$ (unit: $g/cm^3$) is the true density of particles as measured by a fixed volume expansion method, and $Sw$ (unit: $m^2/g$) is the specific surface area of particles as calculated by a Brunauer, Emmet, Teller method using a nitrogen gas as an adsorption gas.

[7] The cathode active material according to any one of [1] to [6], wherein the fluorinated carbon material (C) is a material obtained by bringing a carbon material in the form of particles or fibers into contact with fluorine ($F_2$).

[8] The cathode active material according to any one of [1] to [7], wherein the fluorinated carbon material (C) is fluorinated Ketjen black or fluorinated activated carbon.

[9] A cathode comprising the cathode active material as defined in any one of [1] to [8].

[10] A lithium ion secondary battery having the cathode as defined in [9].

[11] A process for producing a cathode active material, which comprises bringing a carbon material in the form of particles or fibers into contact with fluorine ($F_2$) to obtain a fluorinated carbon material (C), and making the following particles (B) and the following fluorinated carbon material (C) be present on the surface of a composite oxide (A) containing Li and at least one transition metal element selected from the group consisting of Ni, Co and Mn:

particles (B): particles containing an oxide of at least one metal element selected from the group consisting of Ti, Sn, Si, Al, Ce, Y, Zr, Co, W, V, Nb, Ta, La and Mg; and fluorinated carbon material (C): a fluorinated carbon material in the form of particles or fibers.

Advantageous Effects of Invention

According to the cathode active material of the present invention, a LIB having favorable cycle characteristics and having a high energy density even when charged at a high voltage can be obtained.

According to the cathode of the present invention, a LIB having favorable cycle characteristics and having a high energy density even when charged at a high voltage can be obtained.

The LIB of the present invention has favorable cycle characteristics and has a high energy density even when charged at a high voltage.

DETAILED DESCRIPTION OF INVENTION

Figure 1:
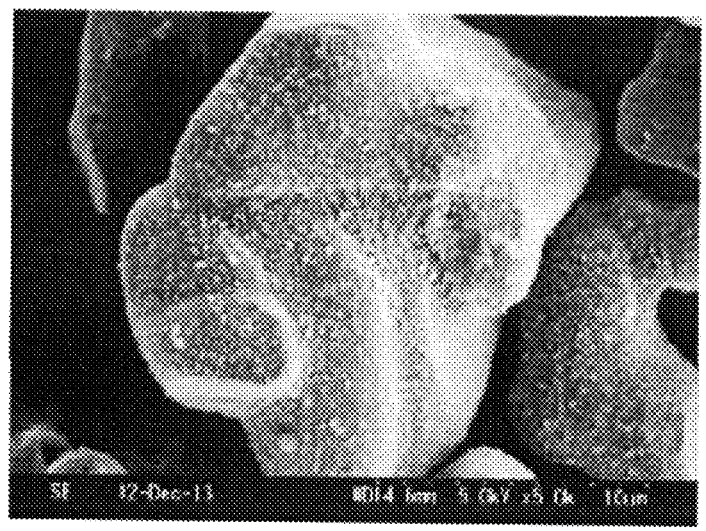
FIG. 1 is a scanning electron microphotograph of the cathode active material (3) in Ex. 3.

The following definitions of terms are applied to this specification and claims.

"Particles present on the surface of the composite oxide" means that on the surface of the composite oxide, particles different from the composite oxide are present directly or via another substance. The particles may be present on part of the surface of the composite oxide, or the particles may be present on the entire surface of the composite oxide. Such another substance is preferably the fluorinated carbon material (C).

"The fluorinated carbon material present on the surface of the composite oxide" means that the fluorinated carbon material is present on the surface of the composite oxide directly or via another substance. The fluorinated carbon material may be present on part of the surface of the composite oxide, or the fluorinated carbon material may be present on the entire surface of the composite oxide. Such another substance is preferably the particles (B).

"The average particle size (1)" is a volume-based particle size at a point of 50% on an accumulative volume distribution curve which is drawn by obtaining the particle size distribution on the volume basis and taking the whole to be 100% (that is, a volume-based accumulative 50% size), and is the average particle size of secondary particles. The particle size distribution is obtained from the frequency distribution and an accumulative volume distribution curve measured by means of a laser scattering particle size distribution measuring apparatus. The measurement of the particle sizes is carried out by sufficiently dispersing the powder in an aqueous medium by e.g. an ultrasonic treatment and measuring the particle size distribution, (for example, by means of a laser diffraction/scattering type particle size distribution measuring apparatus).

"The average particle size (2)" is a value calculated from the surface area and the true density of particles in accordance with the following formula, and is a value of secondary particles.

$$\text{Average particle size (2)}=6/(\rho \cdot Sw)$$

wherein $\rho$ (unit: g/cm$^3$) is the true density of the particles, and Sw (unit: m$^2$/g) is the specific surface area of the particles. In this specification, the true density is a value measured by means of a fixed volume expansion method. In this specification, the specific surface area is a value calculated by a BET (Brunauer, Emmert, Teller) method using a nitrogen gas as an adsorption gas.

"The specific surface area" is a value calculated by a BET method using a nitrogen gas as an adsorption gas.

"The average primary particle size" is an average of diameters of at least 10 primary particles of the carbon material randomly selected by observation with a scanning electron microscope (hereinafter referred to as SEM) or a transmission electron microscope (hereinafter referred to as TEM).

"The average fiber diameter" is an average of diameters of at least 10 fibers of the carbon material randomly selected by observation with a SEM or a TEM.

"The fluorine content" in the fluorinated carbon material is a value measured by an AQF-IC method (auto quick furnace-ion chromatography), and is the mass (unit: %) of fluorine (F) to the total mass of the fluorinated carbon material.

The expression "Li" means a Li element, not a Li metal simple substance, unless otherwise specified. The same applies to expressions of the other elements such as Ni, Co and Mn.

The composition of the composite oxide was measured by an inductively-coupled plasma spectrometry (hereinafter sometimes referred to as ICP). The proportion of the elements of the composite oxide is a value with respect to the composite oxide before initial charging (also called activation treatment).

<Cathode Active Material>

The cathode active material of the present invention (hereinafter referred to as the present active material) is a cathode active material for a LIB, and in the present active material, the particles (B) and the fluorinated carbon material (C) are present on the surface of the composite oxide (A).

The particles (B) are particles containing an oxide of at least one metal element selected from the group consisting of Ti, Sn, Si, Al, Ce, Y, Zr, Co, W, V, Nb, Ta, La, and Mg. Since in the present active material, the particles (B) are present on the surface of the composite oxide (A), when the present active material is used for a LIB, elution of the metal element contained in the composite oxide (A) to the electrolyte can be suppressed.

The fluorinated carbon material (C) is a fluorinated carbon material in the form of particles or fibers. Since in the present active material, the fluorinated carbon material (C) is present on the surface of the composite oxide (A), a decrease in the cycle characteristics is suppressed even when the proportion of the cathode active material in the cathode is increased. Thus, with the present active material, the energy density of a LIB can be increased.

Presence of the particles (B) and the fluorinated carbon material (C) on the surface of the composite oxide (A) in the present active material, and their shapes, may be confirmed by the following method.

By observing the surface or the cross section of the cathode active material itself by a SEM, or by observing the cross section of the cathode active material itself by a TEM, presence of a material having a different composition on the surface of the composite oxide (A) can be confirmed, and the shape of the material present on the surface can be confirmed. Further, by elemental analysis, elements of the particles (B) and the fluorinated carbon material (C) present on the surface of the composite oxide (A) can be confirmed. For analysis of the surface of the cathode active material, as a means of elemental analysis, X-ray photoelectron spectroscopy (XPS) or Auger electron spectroscopy (AES) may be employed. For analysis of the surface or the cross section of the cathode active material, as a means of elemental analysis, SEM-EDX (energy dispersive spectroscopy), X-ray microanalyzer (EPMA) or AES may be employed. Further, for analysis of the cross section of the cathode active material itself, as a means of elemental analysis, TEM-EDS may be employed.

When the cross section of the present active material or the cathode is directly observed, the cross section may be polished or may not be polished. Further, in the case of TEM observation or TEM-EDS analysis, it is common to form the sample into a thin section of at most 100 nm for example by focused ion beams (FIB).

In the present active material, the proportion of the mass of the particles (B) to the total mass of the composite oxide (A) is preferably from 0.01 to 10%. When the particles (B) are present in the above proportion, the cycle characteristics of a LIB having the present active material will be improved. The proportion of the particles (B) to the composite oxide (A) is more preferably from 0.05 to 5%, further preferably from 0.1 to 3%.

The proportion of the particles (B) to the composite oxide (A) may be quantified by analyzing a solution having the present active material dissolved in an acid by ICP. However, in this specification, the proportion in a case where the amount of the particles (B) cannot be obtained by ICP may be represented by the proportion based on the amounts of charge of the composite oxide (A) and the particles (B).

In the present active material, the proportion of the mass of the fluorinated carbon material (C) to the total mass of the composite oxide (A) is preferably from 0.1 to 10%. When the fluorinated carbon material (C) is present in the above proportion, a decrease in the cycle characteristics of a LIB can be suppressed even when the content of the present active material in the cathode is increased. The proportion of the fluorinated carbon material (C) to the composite oxide (A) is more preferably from 0.1 to 5%, further preferably from 0.2 to 3%.

The proportion of the fluorinated carbon material (C) to the composite oxide (A) is obtained from a difference in the carbon amount in the solid as it is as measured by a carbon analyzer between in the particles in which only the particles (B) are present on the surface of the composite oxide (A) or in the composite oxide (A), and in the present active material. However, in this specification, the proportion in a case where the amount of the fluorinated carbon material (C) cannot be obtained by the carbon analyzer may be represented by the proportion based on the amounts of charge of the composite oxide (A) and the fluorinated carbon material (C).

The average particle size (1) of the present active material is preferably from 3 to 30 μm. When the average particle size (1) of the present active material is within the above range, the packing density of the present active material in a LIB will be high. The average particle size (1) of the present active material is more preferably from 4 to 25 μm, further preferably from 5 to 20 μm.

The specific surface area of the present active material is preferably from 0.05 to 10 m$^2$/g. When the specific surface area of the present active material is at least the lower limit, a LIB having the present active material tends to have a high discharge capacity. When the specific surface area of the present active material is at most the upper limit, a LIB having the present active material tends to have high cycle characteristics. The specific surface area of the present active material is more preferably from 0.1 to 5 m$^2$/g.

(Composite Oxide (A))

In the present active material, the composite oxide (A) is a composite oxide containing Li and at least one transition metal element (hereinafter sometimes referred to as transition metal element (X)) selected from the group consisting of Ni, Co and Mn.

The composite oxide (A) is preferably a composite oxide represented by the following formula (I):

$$Li_aNi_xCo_yMn_zMe_bO_2 \quad (I)$$

a is from 0.95 to 1.1. When a is within the above range, an obtainable LIB tends to have a high discharge capacity and high cycle characteristics. a is preferably from 0.97 to 1.06, more preferably from 0.98 to 1.04.

x is from 0 to 1. When x is within the above range, the discharge capacity of an obtainable LIB can be made high. x is preferably from 0.2 to 0.9, more preferably from 0.3 to 0.8.

y is from 0 to 1. When y is within the above range, the discharge average voltage of an obtainable LIB can be made high. y is preferably from 0.05 to 1.0, more preferably from 0.1 to 1.0.

z is from 0 to 1. When z is within the above range, the cycle characteristics of an obtainable LIB can be made high. z is preferably from 0 to 0.7, more preferably from 0.1 to 0.6.

b is from 0 to 0.3. When b is within the above range, an obtainable LIB has sufficiently high cycle characteristics. b is preferably higher than 0 and at most 0.3, particularly preferably from 0.05 to 0.3, especially preferably from 0.05 to 0.25, from the after-mentioned reasons.

The sum (x+y+z+b) of x, y, z and b is from 0.9 to 1.05. When x+y+z+b is within the above range, the discharge capacity, the average voltage and the cycle characteristics of an obtainable LIB can be made high. x+y+z+b is preferably from 0.92 to 1.05, more preferably from 0.95 to 1.05.

The composite oxide (A) is preferably a composite oxide in which part of the transition metal element (X) is replaced with Me, whereby an obtainable LIB has sufficiently high cycle characteristics. That is, b is preferably higher than 0 and at most 0.3. Me is at least one element selected from the group consisting of Al, Mg, Fe, Cr, Mo, Cu, Zr, Ti, W, V and Y. When Me is present in the composite oxide (A), the crystal structure is stabilized, and elution of the transition metal element (X) from the composite oxide (A) to the electrolyte can be suppressed. Me is more preferably at least one member selected from the group consisting of Al and Mg, in view of excellent cycle characteristics.

The composite oxide (A) may contain impurities inevitably included in e.g. a production process within a range not to impair the effects of the present invention.

The composite oxide (A) is preferably in the form of secondary particles having a plurality of primary particles agglomerated.

The average particle size (1) of the secondary particles of the composite oxide (A) is preferably from 3 to 30 μm. When the average particle size (1) of the composite oxide (A) is within the above range, the packing efficiency of the present active material in an obtainable LIB will be sufficiently high. The average particle size (1) of the composite oxide (A) is more preferably from 4 to 25 μm, further preferably from 5 to 20 μm.

The specific surface area of the composite oxide (A) is preferably from 0.05 to 10 $m^2/g$. When the specific surface area of the composite oxide (A) is at least the lower limit, an LIB using the composite oxide (A) tends to have a high discharge capacity. When the specific surface area of the composite oxide (A) is at most the upper limit, a LIB using the composite oxide (A) tends to have high cycle characteristics. The specific surface area of the composite oxide (A) is more preferably from 0.1 to 5 $m^2/g$.

(Particles (B))

In the present active material, the particles (B) present on the surface of the composite oxide (A) are particles containing an oxide of at least one metal element selected from the group consisting of Ti, Sn, Si, Al, Ce, Y, Zr, Co, W, V, Nb, Ta, La and Mg.

The metal element in the particles (B) is preferably at least one member selected from the group consisting of Ti, Sn, Si, Al, Ce, Y, Zr and Co, more preferably at least one member selected from the group consisting of Ti, Sn, Al, Ce and Y. The metal element in the particles (B) is further preferably at least one member selected from the group consisting of Ti, Al and Y.

As the particles (B), one type may be used alone, or two or more types may be used in combination.

The particles (B) may be metal oxide particles containing fluorine. When such particles are present on the surface of the composite oxide (A), the cycle characteristics of an obtainable LIB under discharge at a high voltage will be improved.

In a case where the particles (B) are metal oxide particles containing fluorine, such particles may be produced e.g. by a method of bringing the metal oxide particles into contact with fluorine ($F_2$) or a fluorine compound, or a method of covering the metal oxide particles with a fluorine compound. To bring the metal oxide particles into contact with a fluorine compound, the same method as in a case of the fluorinated carbon material (C) as described hereinafter may be employed.

The average particle size (2) of secondary particles of the particles (B) is preferably from 2 to 100 nm. Particles (B) having an average particle size (2) within the above range will be uniformly present on the surface of the composite oxide (A). As a result, when the present active material is used for a LIB, elution of the metal element contained in the composite oxide (A) to the electrolyte can be suppressed. The average particle size (2) of the particles (B) is more preferably from 5 to 70 nm, further preferably from 10 to 60 nm.

(Fluorinated Carbon Material (C))

In the present active material, the fluorinated carbon material (C) present on the surface of the particles (A) is a fluorinated carbon material in the form of particles or fibers. Fluorine (F) present in the fluorinated carbon material (C) is considered to be chemically-adsorbed as F in the surface of the carbon material.

In a case where the fluorinated carbon material (C) is prepared from a non-crystalline carbon material as the carbon material, fluorine is preferably chemically adsorbed in the edge and the interior surface of pores of the carbon material. In a case where the fluorinated carbon material (C) is prepared from a crystalline carbon material as the carbon material, fluorine is preferably chemically adsorbed in the edge of the carbon material. Fluorine being chemically adsorbed in the surface of the carbon material may be confirmed by thermogravimetric analysis.

The fluorinated carbon material in the form of particles may, for example, be fluorinated carbon black (such as fluorinated Ketjen black, fluorinated acetylene black, fluorinated thermal black, fluorinated furnace black or fluorinated channel black), fluorinated activated carbon, fluorinated graphite, fluorinated fullerene (such as C60, C70 or C84) or fluorinated diamond.

The fluorinated carbon material in the form of fibers may, for example, be fluorinated carbon fibers or fluorinated carbon nanotubes.

The fluorinated carbon material (C) is preferably a fluorinated carbon material in the form of particles, whereby an obtainable LIB has sufficiently high cycle characteristics and a sufficiently high energy density, more preferably fluorinated Ketjen black or fluorinated activated carbon.

As the fluorinated carbon material (C), one type may be used alone, or two or more types may be used in combination.

The fluorinated carbon material in the form of particles, excluding fluorinated activated carbon, has an average primary particle size of preferably from 1 to 500 nm. When the average primary particle size is within the above range, an effect by presence of the fluorinated carbon material in the form of particles is likely to be obtained. The average primary particle size is more preferably from 1 to 200 nm, further preferably from 1 to 100 nm.

The average primary particle size of the fluorinated activated carbon is preferably at least 0.05 μm and less than 10 μm. When the average primary particles size of the fluorinated activated carbon is within the above range, an effect by the presence of the fluorinated activated carbon is likely to be obtained. The average primary particle size of the fluorinated activated carbon is more preferably from 0.1 to 7.5 μm, further preferably from 0.2 to 6 μm.

The average fiber size of the fluorinated carbon material in the form of fibers is preferably from 1 to 200 nm. When the average fiber diameter is within the above range, the fluorinated carbon material in the form of fibers is likely to be present uniformly on the surface of the composite oxide (A) and as a result, an effect by the presence of the fluorinated carbon material in the form of fibers is likely to be obtained. The average fiber size of the fluorinated carbon material in the form of fibers is more preferably from 2 to 150 nm, further preferably from 3 to 100 nm.

The specific surface area of the fluorinated carbon material in the form of particles is preferably from 1 to 3,000 $m^2/g$, more preferably from 5 to 3,000 $m^2/g$.

The specific surface area of the fluorinated carbon material in the form of fibers is preferably from 1 to 2,000 $m^2/g$, more preferably from 10 to 1,500 $m^2/g$.

The fluorine amount (F amount) in the fluorinated carbon material (C) greatly varies depending upon the degree of development of the network structure in the carbon material. The fluorine amount based on the total mass of the fluorinated carbon material is preferably from 1 to 60 mass %, with a view to maintaining the network structure of the carbon material. When the fluorine amount is at least 1 mass %, an effect by the presence of the fluorinated carbon material (C) may be obtained. When the fluorine amount is at most 60 mass %, a decrease in the electrically conductivity of the fluorinated carbon material (C) can be suppressed. The fluorine amount is more preferably from 2 to 55 mass %.

The fluorinated carbon material (C) may be prepared, for example, by bringing a carbon material in the form of particles or fibers into contact with a fluorine compound (hereinafter sometimes referred to as fluorination treatment). The carbon material is usually a material containing no fluorine (that is, a non-fluorinated carbon material), but it may contain fluorine with a low fluorine amount.

The carbon material in the form of particles for the fluorinated carbon material (C) may, for example, be carbon black (such as Ketjen black, acetylene black, thermal black, furnace black or channel black), activated carbon, graphite, fullerene (such as C60, C70 or C84) or diamond.

The carbon material in the form of fibers may, for example, be carbon fibers or carbon nanotubes.

The carbon material in the form of particles, excluding activated carbon, has an average primary particle size of preferably from 1 to 500 nm, more preferably from 1 to 200 nm, further preferably from 1 to 100 nm.

The average primary particle size of the activated carbon is preferably at least 0.05 μm and less than 10 μm, more preferably at least 0.1 μm and less than 7.5 μm, further preferably from 0.2 to 6 μm.

The average fiber size of the carbon material in the form of fibers is preferably from 1 to 200 nm, more preferably from 2 to 150 nm, further preferably from 3 to 100 nm.

The specific surface area of the carbon material in the form of particles is preferably from 1 to 3,000 $m^2/g$, more preferably from 5 to 3,000 $m^2/g$.

The specific surface area of the carbon material in the form of fibers is preferably from 1 to 2,000 $m^2/g$, more preferably from 10 to 1,500 $m^2/g$.

The fluorination treatment is preferably carried out by using fluorine ($F_2$) or a fluorine compound. The fluorine compound may, for example, be hydrogen fluoride, a halogen fluoride (such as $ClF_3$ or $IF_5$), a gaseous fluoride (such as $BF_3$, $NF_3$, $PF_5$, $SiF_4$ or $SF_6$) or a metal fluoride (such as $LiF$ or $NiF_2$).

Among them, in the fluorination treatment, a gaseous fluoride is preferably used, in view of handling efficiency and with a view to reducing impurities contained in the obtainable fluorinated carbon material (C), and $F_2$, $ClF_3$ or $NF_3$ is more preferred, $F_2$ is particularly preferred. In the fluorination treatment using fluorine, in a case where a gaseous fluoride is used, fluorine may be diluted with an inert gas (such as $N_2$). The temperature for the fluorination treatment is preferably from −20° C. to 350° C.

The temperature for the fluorination treatment of the carbon material is preferably from −20 to 350° C. Fluorine in the fluorinated carbon material (C) is preferably chemically adsorbed in the surface of the carbon material in the form of particles or fibers, and accordingly the temperature for the fluorination treatment is preferably from −20 to 350° C. When the temperature for the fluorination treatment is at most 350° C., a decrease in the electrical conductivity of the obtainable fluorinated carbon material in the form of particles or fibers can be suppressed. When the temperature for the fluorination treatment is at least −20° C., fluorine can be chemically adsorbed in the surface of the carbon material in the form of particles or fibers.

(Process for Producing the Present Active Material)

The present active material is preferably produced by obtaining the composite oxide (A) (hereinafter referred to as step (A)) and then making the particles (B) and the fluorinated carbon material (C) be present on the surface of the composite oxide (A) (hereinafter referred to as step (b)).

(Step (a))

The composite oxide (A) may be prepared by a known method. In a case where a commercially available composite oxide (A) is used, the step (a) can be omitted.

(Step (b))

As a method to make the particles (B) and the fluorinated carbon material (C) be present on the surface of the composite oxide (A), the following methods (α), (β) and (γ) may be mentioned.

Method (α): A method of mixing the composite particles (A) and the particles (B) to attach the particles (B) to the surface of the composite oxide (A), and mixing the composite oxide (A) on the surface of which the particles (B) are present, and the fluorinated carbon material (C) to make the fluorinated carbon material (C) be present on the surface of the composite oxide (A) via the particles (B).

Method (β): A method of mixing the composite oxide (A) and the fluorinated carbon material (C) to attach the fluorinated carbon material (C) to the surface of the composite oxide (A), and mixing the composite oxide (A) on the surface of which the fluorinated carbon material (C) is present, and the particles (B) to make the particles (B) be present on the surface of the composite oxide (A) via the fluorinated carbon material (C).

Method (γ): A method of mixing the composite oxide (A), the particles (B) and the fluorinated carbon material (C) simultaneously to make the particles (B) and the fluorinated carbon material (C) be present on the surface of the composite oxide (A).

As a mixing method in the method (α), (β) or (γ), a dry method or a wet method may be mentioned. The dry method is a mixing method without using a dispersion medium. In the present invention, preferred is the dry method, from such reasons that drying after mixing is unnecessary, and preparation of a dispersion necessary for the wet method is unnecessary.

As an apparatus used for mixing in the dry method, a disper, a ball mill, a super mixer, a Henschel mixer, an atomizer, a V-shaped mixer, a paint shaker, a conical blender, a nauta mixer, an SV mixer, a drum mixer, a shaker mixer, a ploughshare mixer, a universal mixer, a ribbon-shaped mixer, a ribbon mixer or a container mixer may, for example, be mentioned. For small-scale mixing, a rotation/revolution mixer (such as THINKY MIXER ARE-310 manufactured by THINKY CORPORATION) may be used.

The mixing time in the dry method is preferably from 1 to 60 minutes, more preferably from 1 to 30 minutes in view of the productivity.

The mixing temperature is preferably from 20 to 30° C.

The present active material obtained by the above process is a cathode material comprising the composite oxide (A), and the particles (B) and the fluorinated carbon material (C) present on the surface of the composite oxide (A). The reason why the effects of the present invention are exhibited when the cathode material is used for a cathode of a LIB is not necessarily clear, but is considered as follows. Since the contact of the composite oxide (A) and the electrolyte is suppressed, elution of the metal elements from the composite oxide (A) to the electrolyte is suppressed, and thus the LIB has favorable cycle characteristics. On the other hand, in the case of a conventional cathode active material in which a metal oxide and a carbon material are present on the surface of a composite oxide, if the proportion of the cathode active material in a cathode is increased so as to increase the energy density, the cycle characteristics tend to be decreased. Whereas the present active material has advantageous such that the cycle characteristics are hardly decreased even when the proportion of the present active material in the cathode is increased, since the fluorinated carbon material (C) is present on the surface of the composite oxide (A). Thus, it is considered that the proportion of the present active material in the cathode can be increased and as a result, a LIB having a high energy density can be obtained.

<Cathode>

The cathode of the present invention (hereinafter sometimes referred to as the present cathode) is a cathode for a LIB and comprises the present active material. Specifically, it comprises a cathode active material layer containing the present active material, an electrically conductive material and a binder formed on a cathode current collector. With the present cathode, the cycle characteristics may be maintained even if the proportion of the present active material in the cathode active material layer is high. The proportion of the present active material based on the mass of the cathode active material layer can be made to be at least 80%, and even when it is from 90 to 93%, the cycle characteristics can be maintained.

(Electrically Conductive Material)

As the electrically conductive material, carbon black (such as acetylene black or Ketjen black), graphite, vapor-grown carbon fibers or carbon nanotubes may, for example, be mentioned.

(Binder)

As the binder, a fluorinated resin (such as polyvinylidene fluoride or polytetrafluoroethylene), a polyolefin (such as polyethylene or polypropylene), a polymer or copolymer having unsaturated bonds (such as a styrene/butadiene rubber, an isoprene rubber or a butadiene rubber) or an acrylic polymer or copolymer (such as an acrylic copolymer or a methacrylic copolymer) may, for example, be mentioned.

(Cathode Current Collector)

As the cathode current collector, an aluminum foil or a stainless steel foil may, for example, be mentioned.

(Method for Producing Cathode)

The present cathode may be produced, for example, by the following method.

The present active material, the electrically conductive material and the binder are dissolved or dispersed in a medium to obtain a slurry. The obtained slurry is applied to the cathode current collector, and the medium is removed e.g. by drying to form a layer of the cathode active material. As the case requires, the layer of the cathode active material may be pressed e.g. by roll pressing. The present cathode is obtained in such a manner.

Otherwise, the cathode active material, the electrically conductive material and the binder are kneaded with a medium to obtain a kneaded product. The obtained kneaded product is pressed on the cathode current collector to obtain the present cathode.

The present cathode containing the present active material may provide a LIB having favorable cycle characteristics and a high energy density even when charged at a high voltage.

<LIB>

The LIB of the present invention (hereinafter sometimes referred to as the present LIB) has the present cathode, an anode and a non-aqueous electrolyte.

(Anode)

The anode contains an anode active material. Specifically, it comprises an anode active material layer containing an anode active material and as the case requires an electrically conductive material and a binder, formed on an anode current collector.

The anode active material may be any material so long as it is capable of absorbing and desorbing lithium ions at a relatively low potential. The anode active material may, for example, be a lithium metal, a lithium alloy, a lithium compound, a carbon material, an oxide composed mainly of a metal in Group 14 of the periodic table, an oxide composed mainly of a metal in Group 15 of the periodic table, a carbon compound, a silicon carbide compound, a silicon oxide compound, titanium sulfide or a boron carbide compound.

The carbon material as the anode active material may, for example, be non-graphitized carbon, artificial graphite, natural graphite, thermally decomposed carbon, cokes (such as pitch coke, needle coke or petroleum coke), graphites, glassy carbons, an organic polymer compound fired product (product obtained by firing and carbonizing a phenol resin, a furan resin or the like at an appropriate temperature), carbon fibers, activated carbon or carbon blacks.

The metal in Group 14 of the periodic table to be used for the anode active material may be Si or Sn, and is preferably Si.

As another anode active material, an oxide such as iron oxide, ruthenium oxide, molybdenum oxide, tungsten oxide, titanium oxide or tin oxide, or a nitride may, for example, be mentioned. As the electrically conductive material and the binder in the anode, the same ones as for the cathode may be used.

As the anode current collector, a metal foil such as a nickel foil or a copper foil may be mentioned.

The anode may be produced by dissolving or dispersing the anode active material, the electrically conductive material and the binder in a medium to obtain a slurry, applying the obtained slurry to the anode current collector, and removing the medium by drying, followed by pressing as the case requires.

(Non-Aqueous Electrolyte)

The non-aqueous electrolyte may, for example, be a non-aqueous electrolytic solution having an electrolyte salt dissolved in an organic solvent; an inorganic solid electrolyte; or a solid or gelled polymer electrolyte in which an electrolyte salt is mixed with or dissolved in e.g. a polymer compound.

The organic solvent may be an organic solvent known for a non-aqueous electrolytic solution. It may, for example, be specifically propylene carbonate, ethylene carbonate, diethyl carbonate, dimethyl carbonate, 1,2-dimethoxyethane, 1,2- diethoxyethane, γ-butyrolactone, diethyl ether, sulfolane, methyl sulfolane, acetonitrile, an acetic acid ester, a butyric acid ester or a propionic acid ester. In view of the voltage stability, preferred is a cyclic carbonate (such as propylene carbonate) or a chain-structured carbonate (such as dimethyl carbonate or diethyl carbonate). Such organic solvents may be used alone or in combination of two or more.

As the inorganic solid electrolyte, a material having lithium ion conductivity may be used. The inorganic solid electrolyte may, for example, be lithium nitride or lithium iodide.

As the polymer to be used for the solid polymer electrolyte, an ether polymer compound (such as polyethylene oxide or its crosslinked product), a polymethacrylate ester polymer compound or an acrylate polymer compound may, for example, be mentioned. Such polymer compounds may be used alone or in combination of two or more.

As the polymer to be used for the gelled polymer electrolyte, a fluorinated polymer compound (such as polyvinylidene fluoride or a vinylidene fluoride/hexafluoropropylene copolymer), polyacrylonitrile, an acrylonitrile copolymer or an ether polymer compound (such as polyethylene oxide or its crosslinked product) may, for example, be mentioned. As a monomer to be copolymerized to obtain the copolymer, polypropylene oxide, methyl methacrylate, butyl methacrylate, methyl acrylate or butyl acrylate may, for example, be mentioned.

The polymer compound is preferably a fluorinated polymer compound in view of the stability against the redox reaction.

As the electrolyte salt, any one of those commonly used for a LIB may be used. The electrolyte salt may, for example, be $LiClO_4$, $LiPF_6$, $LiBF_4$ or $CH_3SO_3Li$.

(Separator)

Between the cathode and the anode, a separator may be interposed so as to prevent short-circuiting. As the separator, a porous film may be mentioned. The porous film is used as impregnated with the non-aqueous electrolytic solution. Further, the porous film impregnated with the non-aqueous electrolytic solution, followed by gelation, may be used as a gelled electrolyte.

(Battery Exterior Package)

As a material of a battery exterior package, nickel-plated iron, stainless steel, aluminum or its alloy, nickel, titanium, a resin material or a film material may, for example, be mentioned.

The shape of the LIB may, for example, be a coin-shape, a sheet-form (film-form), a folded shape, a wound cylinder with bottom, or a button shape, and is suitably selected depending upon the intended use.

The present LIB may have favorable cycle characteristics and have a high energy density even when charged at a high voltage.

EXAMPLES

Now, the present invention will be described in further detail with reference to Examples. In the following Examples, Ex. 1 to 20, 30 to 32, 38 and 39 are Examples of the present invention, and Ex. 21 to 29, 33 to 37, 40 and 41 are Comparative Examples.

[Method for Measuring Specific Surface Area]

The specific surface areas of the composite oxide and the cathode active material were calculated by a nitrogen adsorption BET (Brunauer, Emmett, Teller) method using a specific surface area measuring apparatus (HM model-1208 manufactured by Mountech Co., Ltd.). Deaeration was carried out at 200° C. for 20 minutes.

[Method for Measuring Particle Size]
(Method for Measuring Average Particle Size (1))

The composite oxide or the cathode active material was sufficiently dispersed in water by ultrasonic treatment, secondary particles were measured by a laser diffraction/scattering type particle size distribution measuring apparatus (MT-3300EX manufactured by NIKKISO CO., LTD.), and the frequency distribution and an accumulative volume distribution curve were obtained, whereby the volume-based particle size distribution was obtained. The particle size at a point of 50% on the obtained accumulative volume distribution curve was taken as D50.

(Method for Measuring Average Particle Size (2))

It was calculated from the surface area and the true density of the metal oxide particles in accordance with the following formula:

$$\text{average particle size } (2)=6/(\rho \cdot Sw)$$

wherein ρ (unit: $g/cm^3$) is the true density of the metal oxide, and Sw (unit: $m^2/g$) is the specific surface area of the metal oxide.

[Compositional Analysis]

Compositional analysis of the composite oxide was carried out by using a plasma emission spectroscope (SPS3100H manufactured by SII NanoTechnology Inc.).

[SEM Measuring Method]

A SEM photograph of the cathode active material was taken by a field-emission scanning electron microscope (S-4000 manufactured by Hitachi, Ltd.).

[Method for Evaluating Cycle Characteristcs]

With respect to the LIB, the initial capacity and the cycle characteristics were evaluated.

The LIB was charged to 4.3 V with a load current of 37.5 mA per 1 g of the cathode active material in a constant current/constant voltage mode. Then, the LIB was discharged to 2.75 V with a load current of 37.5 mA (0.25 C) per 1 g of the cathode active material in a constant current mode. The discharge capacity in this first cycle was taken as the initial capacity.

A charge/discharge cycle of charging to 4.5 V with a load current of 150 mA per 1 g of the cathode active material in a constant current mode and then discharging to 2.75 V with a load current of 150 mA per 1 g of the cathode active material in a constant current mode was repeated 50 cycles. Then, the capacity retention and the voltage retention after the 50th cycle were obtained.

The capacity retention (%) after the 50th cycle is a proportion (%) of the discharge capacity in the charging to 4.5 V in the 50th cycle based on the discharge capacity in the charging to 4.5 V in the first cycle.

The voltage retention (%) after the 50th cycle is the proportion (%) of the average discharge voltage in the charging to 4.5 V in the 50th cycle based on the average discharge voltage in the charging to 4.5 V in the first cycle.

[Method for Measuring Cathode Density]

The weight and the volume of the cathode were measured to obtain the density (unit: $g/cm^3$) of the cathode.

[Method for Measuring Energy Density]

The energy density per volume of the cathode of the LIB after the 50th cycle was calculated by multiplying the energy density per mass of the cathode after the 50th cycle by the above-obtained cathode density.

Ex. 1

As the composite oxide (A), $LiCoO_2$ doped with a Al and Mg (manufactured by AGC SEIMI CHEMICAL CO., LTD., composition: $Li_{1.0}Co_{0.98}Al_{0.01}Mg_{0.01}O_2$, average particle size (1): 13 μm, specific surface area: 0.2 m$^2$/g) was used.

As the particles (B), $TiO_2$ (manufactured by C.I. Kasei Company, Ltd., average particle size (2): 32 nm, specific surface area: 50 m$^2$/g) in the form of particles was used.

As the fluorinated carbon material (C), fluorinated Ketjen black (average primary particle size: 37 nm, specific surface area: 760 m$^2$/g, fluorine content: 38 mass %) prepared by the following method was used.

Ketjen black (registered trademark) (manufactured by Ketjen Black international, Ketjen EC600JD, average primary particle size: 34 nm, specific surface area: 1,400 m$^2$/g) was introduced into a reactor with high air-tightness. The reactor was evaluated of air, and a gas mixture of $F_2/N_2=80/20$ (volume ratio) was introduced to a pressure of 0.005 MPaG at 20° C., and such a state was maintained for 4 hours to obtain fluorinated Ketjen black.

3 g of the composite oxide (A) and 0.01 g of the particles (B) were put in a 125 mL container and mixed by using a rotation/revolution mixer (THINKY MIXER ARE-310 manufactured by THINKY CORPORATION) at 2,000 rpm for 2 minutes. 0.05 g of the fluorinated carbon material (C) was added, and the mixture was further mixed by the rotation/revolution mixer at 2,000 rpm for 2 minutes to obtain a cathode active material (1).

Of the cathode active material (1), the average particle size (1) was 14 μm, and the specific surface area was 11 m$^2$/g.

Ex. 2 to 4

Cathode active materials (2) to (4) were obtained in the same manner as in Ex. 1 except that the mixing ratio of the composite oxide (A), the particles (B) and the fluorinated carbon material (C) was as shown in Table 1.

A SEM photograph of the cathode active material (3) is shown in FIG. 1.

Ex. 5 to 8

Activated carbon (manufactured by KURARAY CHEMICAL CO., LTD., YP20, average primary particle size: 5 μm, specific surface area: 1,850 m$^2$/g) was introduced into a reactor with high air-tightness. The reactor was evacuated of air, a gas mixture of $F_2/N_2=80/20$ (volume ratio) was introduced to a pressure of 0.005 MPaG at 20° C., and such a state was maintained for 4 hours to obtain fluorinated activated carbon.

Cathode active materials (5) to (8) were obtained in the same manner as in Ex. 1 except that fluorinated activated carbon (average primary particle size: 5 nm, specific surface area: 800 m$^2$/g, fluorine content: 36 mass %) was used as the fluorinated carbon material (C), and that the mixing ratio of the composite oxide (A), the particles (B) and the fluorinated carbon material (C) are as shown in Table 1.

Ex. 9

A cathode active material (9) was obtained in the same manner as in Ex. 1 except that $SnO_2$ (manufactured by C.I. Kasei Company, Ltd., average particle size (2): 19 nm, specific surface area: 50 m$^2$/g) in the form of particles was used as the particles (B).

Ex. 10

A cathode active material (10) was obtained in the same manner as in Ex. 3 except that $SiO_2$ (manufactured by C.I. Kasei Company, Ltd., average particle size (2): 29 nm, specific surface area: 95 m$^2$/g) in the form of particles was used as the particles (B).

Ex. 11

A cathode active material (11) was obtained in the same manner as in Ex. 3 except that $Al_2O_3$ (manufactured by C.I. Kasei Company, Ltd., average particle size (2): 34 nm, specific surface area: 50 m$^2$/g) in the form of particles was used as the particles (B).

Ex. 12

A cathode active material (12) was obtained in the same manner as in Ex. 3 except that $CeO_2$ (manufactured by C.I. Kasei Company, Ltd., average particle size (2): 12 nm, specific surface area: 70 m$^2$/g) in the form of particles was used as the particles (B).

Ex. 13

A cathode active material (13) was obtained in the same manner as in Ex. 3 except that $Y_2O_3$ (manufactured by C.I. Kasei Company, Ltd., average particle size (2): 29 nm, specific surface area: 40 m$^2$/g) in the form of particles was used as the particles (B).

Ex. 14

$TiO_2$ (manufactured by C.I. Kasei Company, Ltd., average particle size (2): 32 nm, specific surface area: 50 m$^2$/g) in the form of particles was introduced into a reactor with high air-tightness. The reactor was evacuated of air, a gas mixture of $F_2/N_2=80/20$ (volume ratio) was introduced to a pressure of 0.005 MPaG at 140° C., and such a state was maintained for 4 hours to obtain $TiO_2$ subjected to fluorination treatment.

A cathode active material (14) was obtained in the same manner as in Ex. 3 except that the $TiO_2$ subjected to fluorination treatment was used as the particles (B).

Ex. 15

$CeO_2$ (manufactured by C.I. Kasei Company, Ltd., average particle size (2): 12 nm, specific surface area: 70 m$^2$/g) in the form of particles was introduced into a reactor with high air-tightness. The reactor was evacuated of air, a gas mixture of $F_2/N_2=80/20$ (volume ratio) was introduced to a pressure of 0.005 MPaG at 140° C., and such a state was maintained for 4 hours to obtain $CeO_2$ subjected to fluorination treatment.

A cathode active material (15) was obtained in the same manner as in Ex. 3 except that the $CeO_2$ subjected to fluorination treatment was used as the particles (B).

17

Ex. 16

A cathode active material (16) was obtained in the same manner as in Ex. 11 except that LiCoO$_2$ (manufactured by AGC SEIMI CHEMICAL CO., LTD., average particle size (1): 14 μm, specific surface area: 0.4 m$^2$/g) was used as the composite oxide (A).

Ex. 17

A cathode active material (17) was obtained in the same manner as in Ex. 16 except that the particles (B) used in Ex. 13 were used.

Ex. 18

A cathode active material (18) was obtained in the same manner as in Ex. 16 except that ZrO$_2$ (manufactured by NIPPON DENKO CO., LTD., average particle size (2): 30 nm, specific surface area: 33 m$^2$/g) in the form of particles was used as the particles (B).

Ex. 19

A cathode active material (19) was obtained in the same manner as in Ex. 16 except that cobalt blue (manufactured by C.I. Kasei Company, Ltd., average particle size (2): 40 nm, specific surface area: 38 m$^2$/g) in the form of particles was used as the particles (B).

Ex. 20

A cathode active material (20) was obtained in the same manner as in Ex. 16 except that the particles (B) used in Ex. 15 were used.

Ex. 21

A cathode active material (21) was obtained in the same manner as in Ex. 1 except that the particles (B) were not used.

Ex. 22

Figure 2:
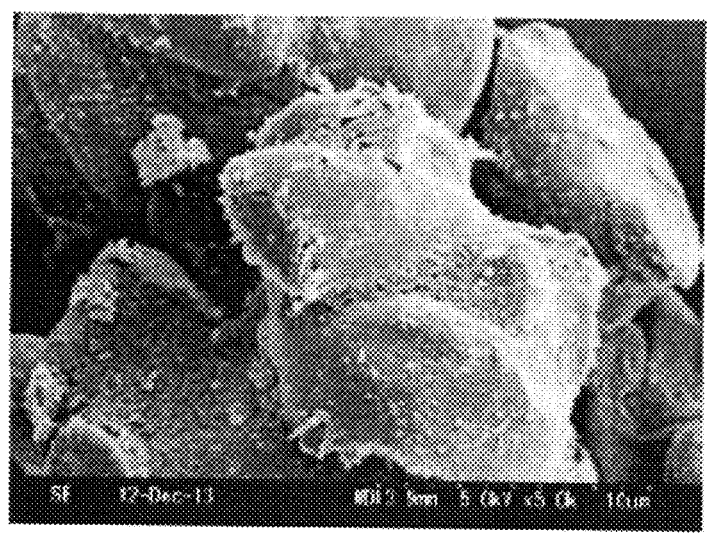
FIG. 2 is a scanning electron microphotograph of the cathode active material (22) in Ex. 22.

A cathode active material (22) was obtained in the same manner as in Ex. 3 except that the particles (B) were not used. A SEM photograph of the cathode active material (22) is shown in FIG. 2.

Ex. 23

Figure 3:
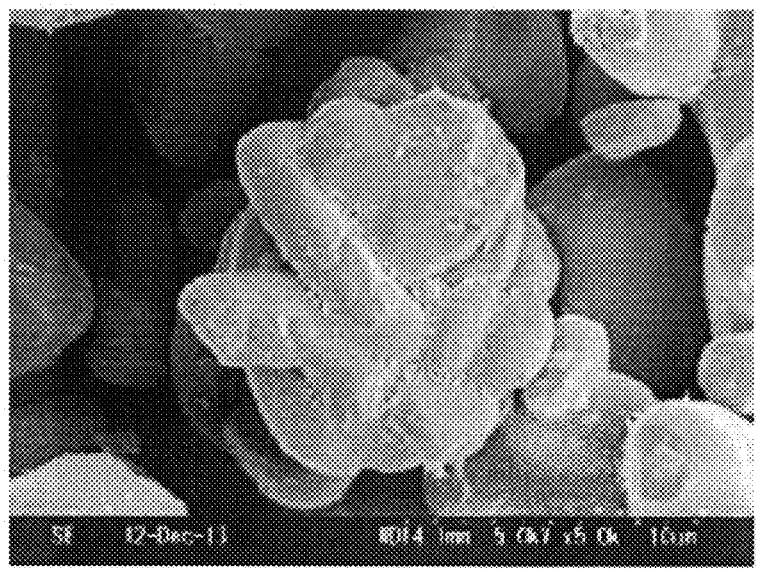
FIG. 3 is a scanning electron microphotograph of the cathode active material (23) in Ex. 23.

A cathode active material (23) was obtained in the same manner as in Ex. 1 except that the fluorinated carbon material (C) was not used. A SEM photograph of the cathode active material (23) is shown in FIG. 3.

Ex. 24

A cathode active material (24) was obtained in the same manner as in Ex. 10 except that the fluorinated carbon material (C) was not used.

Ex. 25

LiCoO$_2$ (manufactured by AGC SEIMI CHEMICAL CO., LTD., composition: Li$_{1.0}$Co$_{0.98}$Al$_{0.01}$Mg$_{0.01}$O$_2$, average particle size (1): 13 μm, specific surface area: 0.2 m$^2$/g) doped with Al and Mg was used alone as a cathode active material (25).

Ex. 26

A cathode active material (26) was obtained in the same manner as in Ex. 16 except that the fluorinated carbon material (C) was not used.

Ex. 27

A cathode active material (27) was obtained in the same manner as in Ex. 20 except that the fluorinated carbon material (C) was not used.

Ex. 28

A cathode active material (28) was obtained in the same manner as in Ex. 10 except that Ketjen black (registered trademark) (manufactured by Ketjen Black International, Ketjen EC600JD, average primary particle size: 34 nm, specific surface area: 1,400 m$^2$/g) which was not fluorinated was used instead of the fluorinated carbon material (C).

Ex. 29

LiCoO$_2$ (manufactured by AGC SEIMI CHEMICAL CO., LTD., average particle size (1): 14 μm, specific surface area: 0.4 m$^2$/g) was used alone as a cathode active material (29).

A LIB having each of the cathode active materials in Ex. 1 to 29 was produced, and the density of the cathode and the cycle characteristics were evaluated. The discharge capacity, the average discharge voltage and the energy density per unit volume after the 50th cycle of each LIB are shown in Tables 1 and 2.

2.04 g of the cathode active material, 0.25 g of acetylene black (manufactured by Denki Kagaku Kogyo Kabushiki Kaisha, DENKA BLACK), 2.07 g of a 12 mass % N-methylpyrrolidone solution of polyvinylidene fluoride and 4.02 g of N-methylpyrrolidone were weighed and mixed by a rotation/revolution mixer (THINKY MIXER ARE-310 manufactured by THINKY CORPORATION) to obtain a slurry. The slurry was applied to an aluminum sheet (cathode current collector) to form a layer of the cathode active material thereby to prepare a cathode sheet. The cathode sheet was pressed by roll pressing with a 40 μm gap twice and punched into a circle having a diameter of 18 mm, which was vacuum-dried at 180° C. to prepare a cathode.

As the anode, an anode having a metal lithium foil having an average thickness of 300 μm formed on a stainless steel plate (anode current collector) having an average thickness of 1 mm was used.

As the separator, a separator consisting of two sheets of porous polypropylene (manufactured by Celgard, tradename: #2500, average thickness: 25 μm) overlaid was used.

As the electrolytic solution, a solution having LiPF$_6$ dissolved at a concentration of 1 mol/dm$^3$ in a solvent mixture of diethylene carbonate/ethylene carbonate=1/1 (volume ratio) was used.

In an argon glove box, the cathode, the separator and the anode were laminated in this order in a battery evaluation cell of a stainless steel simple sealed cell type, and the electrolytic solution was put to assemble a LIB.

TABLE 1

| Ex. | Cathode active material | Composite oxide (A) | Particles (B) Type | Amount (mass %) | Carbon material Type | Amount (mass %) | Discharge capacity (mAh/g) | Capacity retention (%) | Average discharge voltage (V) | Voltage retention (%) | Energy density (mWh/cm³) |
|---|---|---|---|---|---|---|---|---|---|---|---|
| 1 | (1) | Doped LCO | $TiO_2$ | 0.3 | Fluorinated KB | 1.7 | 163.2 | 95 | 3.97 | 99 | |
| 2 | (2) | Doped LCO | $TiO_2$ | 0.7 | Fluorinated KB | 1.3 | 161.3 | 95 | 3.97 | 99 | |
| 3 | (3) | Doped LCO | $TiO_2$ | 0.3 | Fluorinated KB | 0.7 | 162.7 | 94 | 3.96 | 98 | 1493.6 |
| 4 | (4) | Doped LCO | $TiO_2$ | 0.3 | Fluorinated KB | 0.2 | 154.6 | 92 | 3.93 | 98 | |
| 5 | (5) | Doped LCO | $TiO_2$ | 0.3 | Fluorinated activated carbon | 1.7 | 160 | 95 | 3.94 | 99 | |
| 6 | (6) | Doped LCO | $TiO_2$ | 0.7 | Fluorinated activated carbon | 1.3 | 159.9 | 95 | 3.93 | 99 | |
| 7 | (7) | Doped LCO | $TiO_2$ | 0.3 | Fluorinated activated carbon | 0.7 | 155 | 95 | 3.94 | 99 | |
| 8 | (8) | Doped LCO | $TiO_2$ | 0.3 | Fluorinated activated carbon | 0.2 | 155.7 | 93 | 3.95 | 98 | |
| 9 | (9) | Doped LCO | $SnO_2$ | 0.3 | Fluorinated KB | 1.7 | 155.8 | 93 | 3.94 | 98 | |
| 10 | (10) | Doped LCO | $SiO_2$ | 0.3 | Fluorinated KB | 0.7 | 119.2 | 74 | 3.53 | 89 | 976.2 |
| 11 | (11) | Doped LCO | $Al_2O_3$ | 0.3 | Fluorinated KB | 0.7 | 163.8 | 96 | 4 | 100 | |
| 12 | (12) | Doped LCO | $CeO_2$ | 0.3 | Fluorinated KB | 0.7 | 156.7 | 93 | 3.98 | 99 | |
| 13 | (13) | Doped LCO | $Y_2O_3$ | 0.3 | Fluorinated KB | 0.7 | 161.5 | 97 | 4 | 100 | |
| 14 | (14) | Doped LCO | $TiO_2$ subjected to fluorination treatment | 0.3 | Fluorinated KB | 0.7 | 157.5 | 96 | 3.99 | 100 | |
| 15 | (15) | Doped LCO | $CeO_2$ subjected to fluorination treatment | 0.3 | Fluorinated KB | 0.7 | 163.1 | 97 | 4.01 | 100 | |
| 16 | (16) | $LiCoO_2$ | $Al_2O_3$ | 0.3 | Fluorinated KB | 0.7 | 166.7 | 93 | 3.97 | 99 | |
| 17 | (17) | $LiCoO_2$ | $Y_2O_3$ | 0.3 | Fluorinated KB | 0.7 | 155 | 94 | 3.96 | 101 | |
| 18 | (18) | $LiCoO_2$ | $ZrO_2$ | 0.3 | Fluorinated KB | 0.7 | 156.6 | 93 | 3.89 | 100 | |
| 19 | (19) | $LiCoO_2$ | Cobalt blue | 0.3 | Fluorinated KB | 0.7 | 154.7 | 92 | 3.94 | 99 | |
| 20 | (20) | $LiCoO_2$ | $CeO_2$ subjected to fluorination treatment | 0.3 | Fluorinated KB | 0.7 | 162.1 | 90 | 3.96 | 99 | 1489.2 |

Doped LCO: $Li_{1.0}Co_{0.98}Al_{0.01}Mg_{0.01}O_2$,
KB: Ketjen black

TABLE 2

| Ex. | Cathode active material | Composite oxide (A) | Particles (B) Type | Amount (mass %) | Carbon material Type | Amount (mass %) | Discharge capacity (mAh/g) | Capacity retention (%) | Average discharge voltage (V) | Voltage retention (%) | Energy density (mWh/cm³) |
|---|---|---|---|---|---|---|---|---|---|---|---|
| 21 | (21) | Doped LCO | — | — | Fluorinated KB | 1.7 | 151.1 | 98 | 3.89 | 99 | |
| 22 | (22) | Doped LCO | — | — | Fluorinated KB | 0.7 | 107.5 | 66 | 3.61 | 91 | 869.9 |
| 23 | (23) | Doped LCO | $TiO_2$ | 0.3 | — | — | 161.2 | 91 | 3.93 | 98 | 1470.6 |
| 24 | (24) | Doped LCO | $SiO_2$ | 0.3 | — | — | 57.2 | 36 | 3.67 | 93 | 487 |
| 25 | (25) | Doped LCO | — | — | — | — | 71.5 | 43 | 3.52 | 90 | |
| 26 | (26) | $LiCoO_2$ | $Al_2O_3$ | 0.3 | — | — | 155.1 | 93 | 3.98 | 99 | |
| 27 | (27) | $LiCoO_2$ | $CeO_2$ subjected to fluorination treatment | 0.3 | — | — | 147.0 | 82 | 3.93 | 98 | 1341.7 |
| 28 | (28) | $LiCoO_2$ | $SiO_2$ | 0.3 | KB | 0.7 | 51.5 | 32 | 3.63 | 93 | 498 |
| 29 | (29) | $LiCoO_2$ | — | — | — | — | 23.0 | 15 | 3.18 | 82 | |

Doped LCO: $Li_{1.0}Co_{0.98}Al_{0.01}Mg_{0.01}O_2$,
KB: Ketjen black

Ex. 30 to 37

LIBs were produced in the same manner as in Ex. 1 to 29 except that the cathode active materials (3), (10), (20), (22), (23), (24), (27) and (28) were used and that the ratio of the cathode active material in the cathode active material layer was changed. The density of each cathode, and the discharge capacity, the average discharge voltage and the energy density per volume of the cathode after the 50th cycle of each LIB are shown in Table 3.

The ratio of the cathode active material in the cathode active material layer was such that the cathode active material: acetylene black:polyvinylidene fluoride=92:4:4 by the mass ratio.

TABLE 3

| Ex. | Cathode active material | Composite oxide (A) | Particles (B) Type | Amount (mass %) | Carbon material Type | Amount (mass %) | Cathode density (g/cm³) | Discharge capacity (mAh/g) | Capacity retention (%) | Average discharge voltage (V) | Voltage retention (%) | Energy density (mWh/cm³) |
|---|---|---|---|---|---|---|---|---|---|---|---|---|
| 30 | (3) | Doped LCO | TiO₂ | 0.3 | Fluorinated KB | 0.7 | 3.1 | 153.4 | 94 | 3.89 | 98 | 1702.2 |
| 31 | (10) | Doped LCO | SiO₂ | 0.3 | Fluorinated KB | 0.7 | 3.1 | 137 | 84 | 3.71 | 94 | 1589.9 |
| 32 | (20) | LiCoO₂ | CeO₂ subjected to fluorination treatment | 0.3 | Fluorinated KB | 0.7 | 3.4 | 154.1 | 87 | 3.92 | 99 | 1889.5 |
| 33 | (22) | Doped LCO | — | — | Fluorinated KB | 0.7 | 3.0 | 130.3 | 81 | 3.65 | 93 | 1313.1 |
| 34 | (23) | Doped LCO | TiO₂ | 0.3 | — | — | 3.1 | 148.8 | 88 | 3.86 | 96 | 1636.4 |
| 35 | (24) | Doped LCO | SiO₂ | 0.3 | — | — | 3.4 | 25.4 | 17 | 3.3 | 87 | 265 |
| 36 | (27) | LiCoO₂ | CeO₂ subjected to fluorination treatment | 0.3 | — | — | 3.4 | 72.9 | 41.7 | 3.63 | 92 | 828 |
| 37 | (28) | Doped LCO | SiO₂ | 0.3 | KB | 0.7 | 3.4 | 38.3 | 24 | 3.54 | 91 | 424 |

Doped LCO: $Li_{1.0}Co_{0.98}Al_{0.01}Mg_{0.01}O_2$,
KB: Ketjen black

Ex. 38

A cathode active material (29) was obtained in the same manner as in Ex. 1 except that composition: $LiNi_{0.5}Co_{0.2}Mn_{0.3}O_2$ (manufactured by AGC SEIMI CHEMICAL CO., LTD., average particle size (1): 5.8 μm, specific surface area: 0.6 m²/g) was used as the composite oxide (A) and $Al_2O_3$ (manufactured by C.I. Kasei Company, Ltd., average particle size (2): 34 nm, specific surface area: 50 m²/g) in the form of particles was used as the particles (B).

Ex. 39

A cathode active material (30) was obtained in the same manner as in Ex. 38 except that composition: $Li(Li_{0.2}Ni_{0.2}Mn_{0.6})O_2$ (manufactured by ISE CHEMICALS CORPORATION, average particle size (1): 4.9 μm, specific surface area: 2.4 m²/g) was used as the composite oxide (A).

Ex. 40

$LiNi_{0.5}Co_{0.2}Mn_{0.3}O_2$ (manufactured by AGC SEIMI CHEMICAL CO., LTD., average particle size (1): 5.8 μm, specific surface area: 0.6 m²/g) was used alone as a cathode active material (31).

Ex. 41

$Li(Li_{0.2}Ni_{0.2}Mn_{0.6})O_2$ (manufactured by ISE CHEMICALS CORPORATION, average particle size (1): 4.9 μm, specific surface area: 2.4 m²/g) was used alone as a cathode active material (32).

LIBs were produced in the same manner as in Ex. 1 to 29 except that the cathode active materials (29) and (31) were used and that the ratio of the cathode active material in the cathode active material layer was changed as below. The density of each cathode, and the discharge capacity, the average discharge voltage and the energy density per volume of the cathode after the 50th cycle of each LIB are shown in Table 4.

The ratio of the cathode active material in the cathode active material layer was such that the cathode active material: acetylene black:polyvinylidene fluoride=92:4:4 by the mass ratio.

LIBs were produced in the same manner as in Ex. 1 to 29 except that the cathode active materials (30) and (32) were used and that the ratio of the cathode active material in the cathode active material layer was changed as below. The density of each cathode, and the discharge capacity, the average discharge voltage and the energy density per volume of the cathode after the 50th cycle of each LIB are shown in Table 4.

The ratio of the cathode active material in the cathode active material layer was such that the cathode active material: acetylene black:polyvinylidene fluoride=92:4:4 by the mass ratio.

In the case of using the cathode active material (30) and (32), the initial capacity and the cycle characteristics were evaluated under the following condition.

The LIB was charged to 4.7 V with a load current of 37.5 mA per 1 g of the cathode active material in a constant current/constant voltage mode. Then, the LIB was discharged to 2.0 V with a load current of 37.5 mA (0.25 C) per 1 g of the cathode active material in a constant current mode. The discharge capacity in this first cycle was taken as the initial capacity.

A charge/discharge cycle of charging to 4.7 V with a load current of 150 mA per 1 g of the cathode active material in a constant current mode and then discharging to 2.0 V with a load current of 150 mA per 1 g of the cathode active material in a constant current mode was repeated 50 cycles. Then, the capacity retention and the voltage retention after the 50th cycle were obtained.

The capacity retention (%) after the 50th cycle is a proportion (%) of the discharge capacity in the charging to 4.7 V in the 50th cycle based on the discharge capacity in the charging to 4.7 V in the first cycle.

The voltage retention (%) after the 50th cycle is the proportion (%) of the average discharge voltage in the charging to 4.7 V in the 50th cycle based on the average discharge voltage in the charging to 4.7 V in the first cycle.

TABLE 4

| | | | Particles (B) | | Carbon material | | | | | | Cycle characteristics (after the 50th cycle) | | |
| | Cathode active material | Composite oxide (A) | Type | Amount (mass %) | Type | Amount (mass %) | Cathode density (g/cm³) | Charge Voltage (V) | Discharge capacity (mAh/g) | Capacity retention (%) | Average discharge voltage (V) | Voltage retention (%) | Energy density (mWh/cm³) |
|---|---|---|---|---|---|---|---|---|---|---|---|---|---|
| 38 | (29) | LiNiCoMnO | Al₂O₃ | 0.3 | Fluorinated KB | 0.7 | 2.7 | 4.5 | 160.5 | 93 | 3.78 | 98 | 2509.3 |
| 39 | (30) | Li(LiNiCoMn)O | Al₂O₃ | 0.3 | Fluorinated KB | 0.7 | 2.6 | 4.7 | 175.6 | 89 | 3.36 | 96 | 2550.2 |
| 40 | (31) | LiNiCoMnO | — | — | — | — | 2.8 | 4.5 | 153.3 | 90 | 3.75 | 98 | 2379.2 |
| 41 | (32) | Li(LiNiCoMn)O | — | — | — | — | 2.5 | 4.7 | 136.5 | 69 | 3.38 | 97 | 1996.2 |

Figure 4:
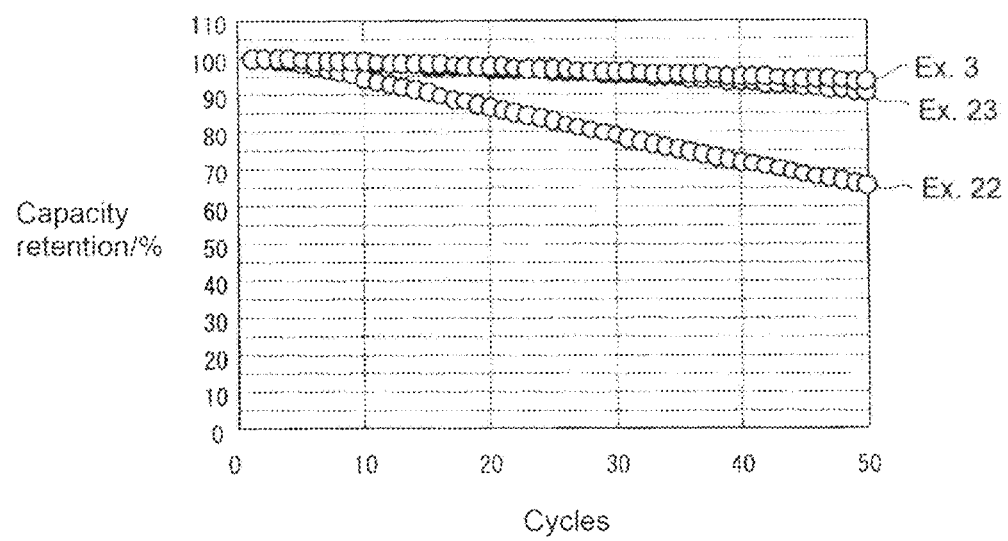
FIG. 4 is a graph illustrating capacity retentions of LIBs in the 50th cycle in Ex. 3, 22 and 23.
Figure 5:
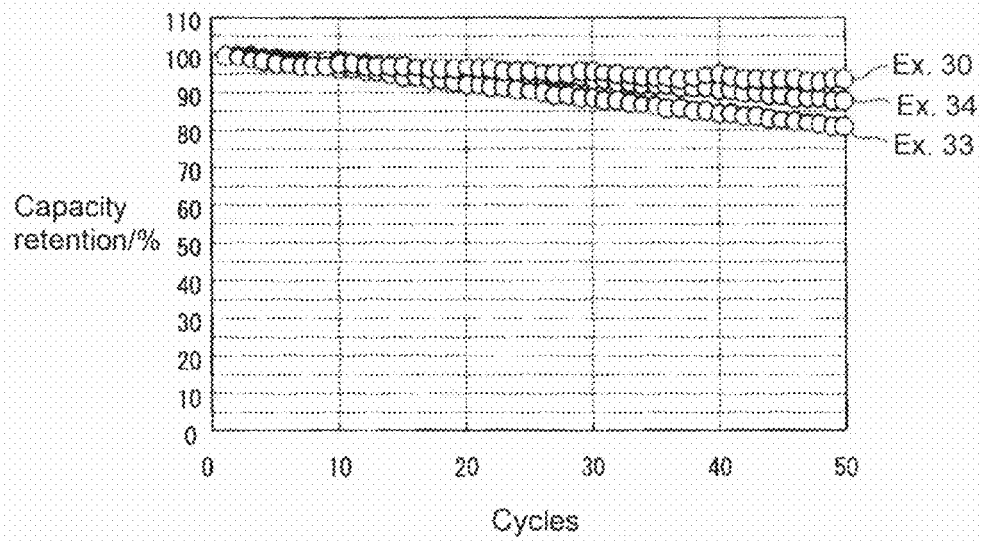
FIG. 5 is a graph illustrating capacity retentions of LIBs in the 50th cycle in Ex. 30, 33 and 34.
Figure 6:
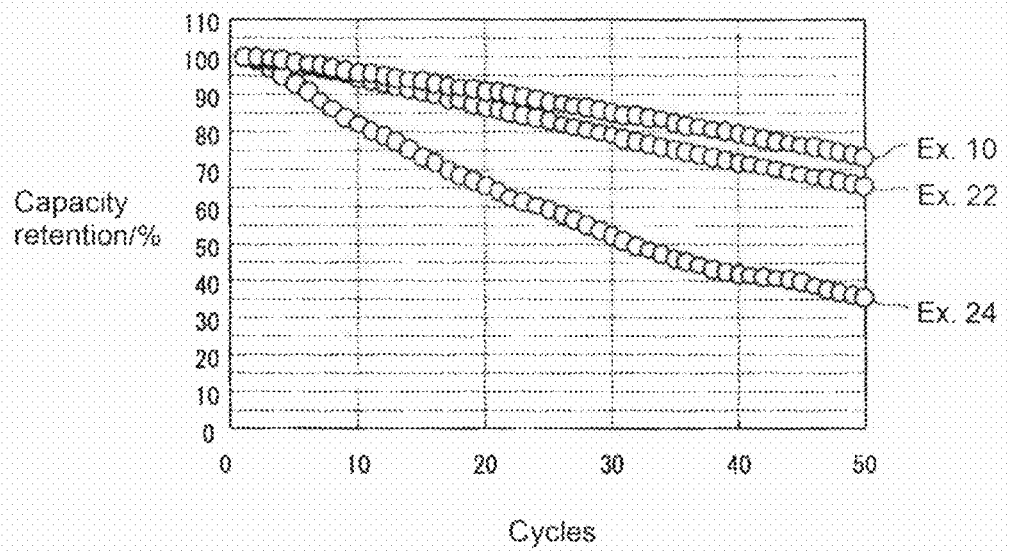
FIG. 6 is a graph illustrating capacity retentions of LIBs in the 50th cycle in Ex. 10, 22 and 24.
Figure 7:
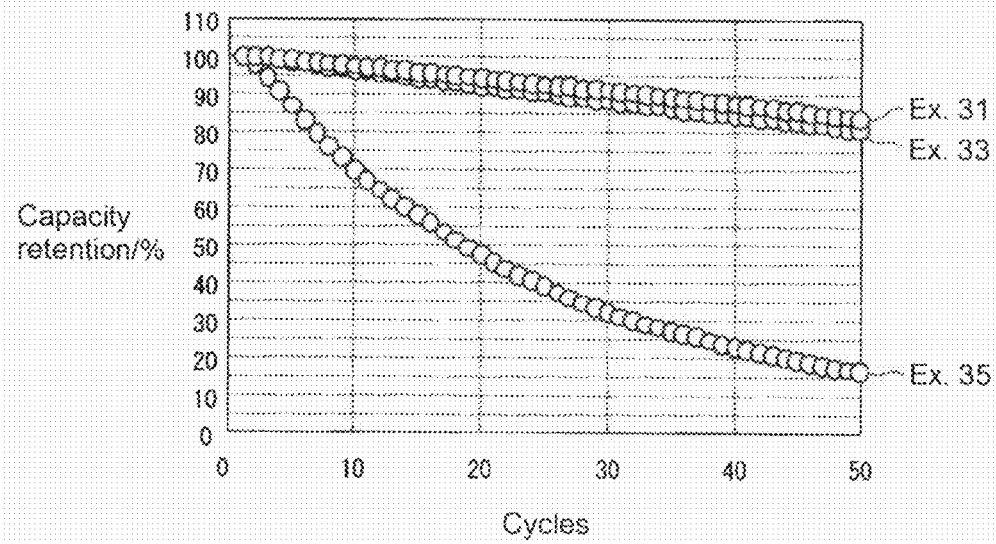
FIG. 7 is a graph illustrating capacity retentions of LIBs in the 50th cycle in Ex. 31, 33 and 35.

LiNiCoMnO: $LiNi_{0.5}Co_{0.2}Mn_{0.3}O_2$,
Li(LiNiCoMn)O: $Li(Li_{0.2}Ni_{0.2}Mn_{0.6})O_2$,
KB: Ketjen black FIG. 4 is a graph illustrating capacity retentions of LIBs in Ex. 3, 22 and 23 in the 50th cycle. FIG. 5 is a graph illustrating capacity retentions of LIBs in Ex. 30, 33 and 34 in the 50th cycle. FIG. 6 is a graph illustrating capacity retentions of LIBs in Ex. 10, 22 and 24 in the 50th cycle. FIG. 7 is a graph illustrating capacity retentions of LIBs in Ex. 31, 33 and 35 in the 50th cycle.

It is found from these graphs that a LIB having high cycle characteristics can be obtained by using the cathode active material of the present invention.

Figure 8:
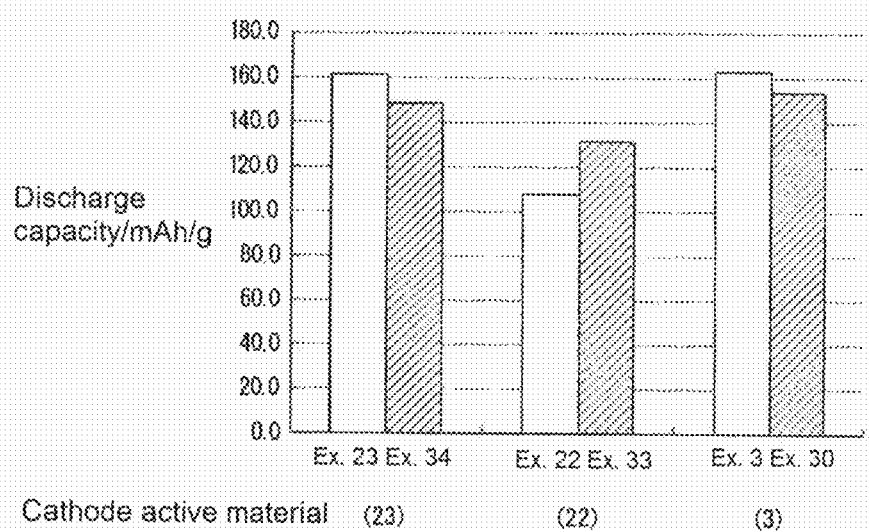
FIG. 8 is a graph illustrating discharge capacities of LIBs after the 50th cycle in Ex. 3, 22, 23, 30, 33 and 34.
Figure 9:
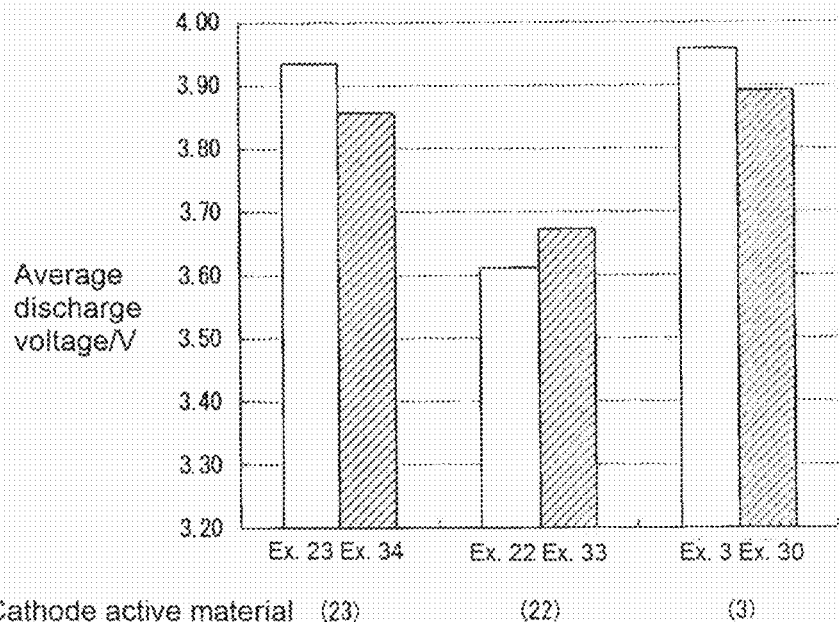
FIG. 9 is a graph illustrating average discharge voltages of LIBs after the 50th cycle in Ex. 3, 22, 23, 30, 33 and 34.
Figure 10:
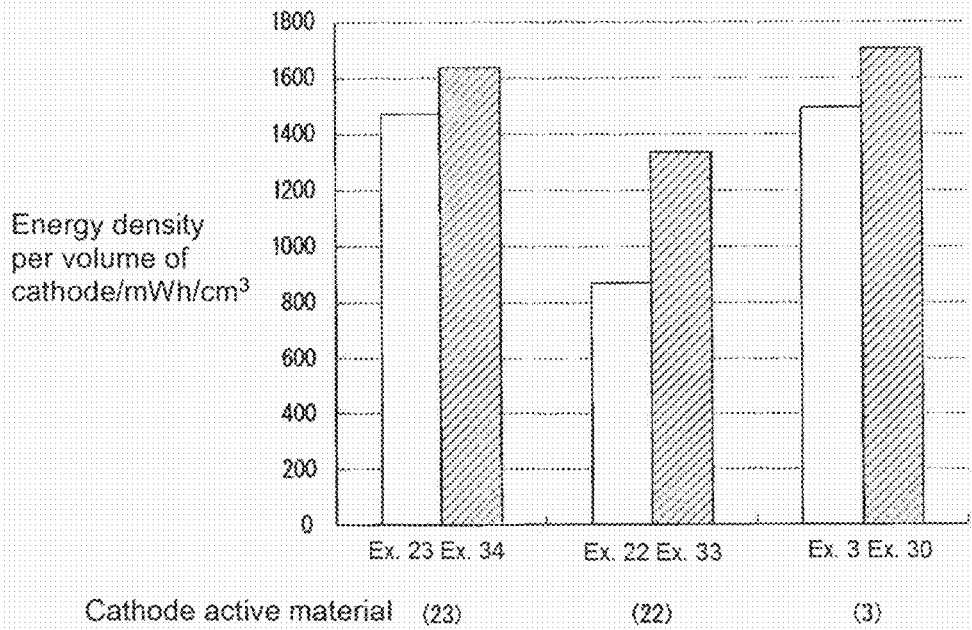
FIG. 10 is a graph illustrating energy densities per unit volume of LIBs after the 50th cycle in Ex. 3, 22, 23, 30, 33 and 34.

FIGS. 8 to 10 are graphs illustrating the discharge capacity, the average discharge voltage and the energy density per volume of the cathode after the 50th cycle of LIBs using the cathode active materials (3), (22) and (23).

Figure 11:
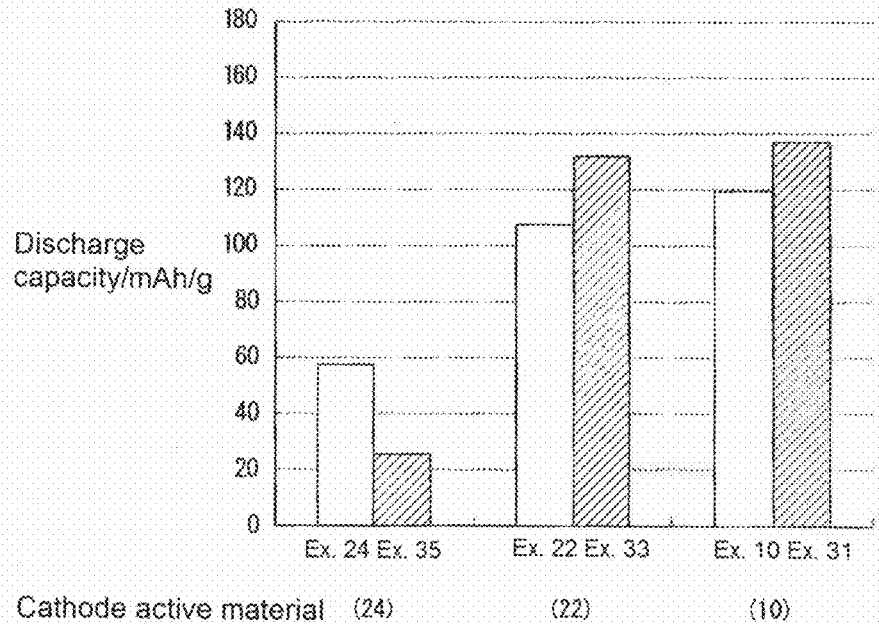
FIG. 11 is a graph illustrating discharge capacities of LIBs after the 50th cycle in Ex. 10, 22, 24, 31, 33 and 35.
Figure 12:
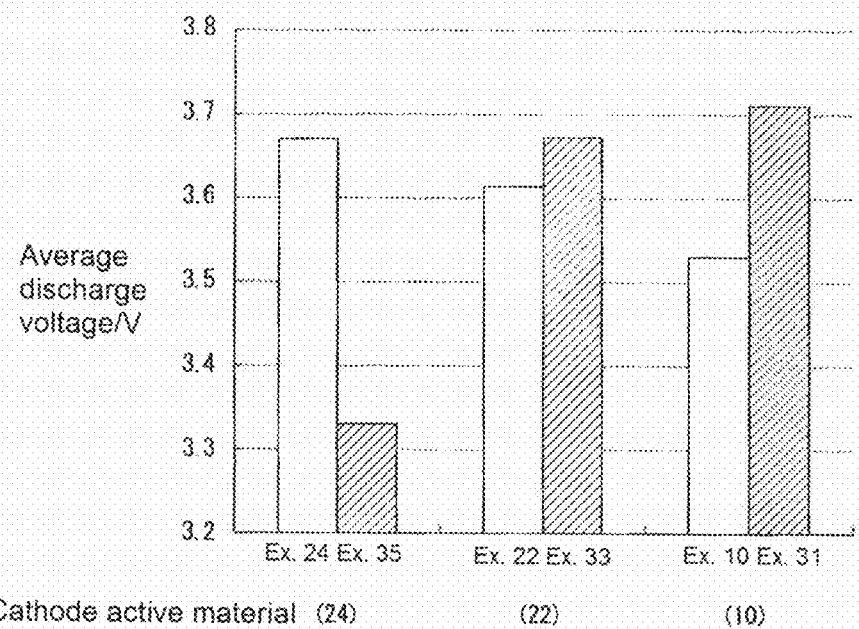
FIG. 12 is a graph illustrating average discharge voltages of LIBs after the 50th cycle in Ex. 10, 22, 24, 31, 33 and 35.
Figure 13:
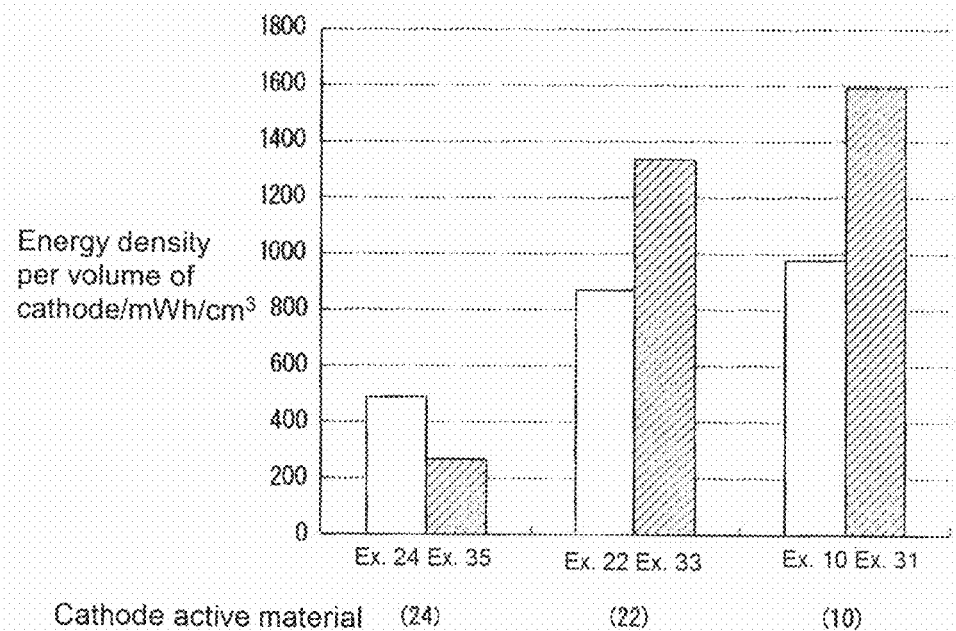
FIG. 13 is a graph illustrating energy densities per unit volume of LIBs after the 50th cycle in Ex. 10, 22, 24, 31, 33 and 35.

FIGS. 11 to 13 are graphs illustrating the discharge capacity, the average discharge voltage and the energy density per volume of the cathode after the 50th cycle of LIBs using the cathode active materials (10), (22) and (24).

It is found that a LIB using the cathode active material of the present invention has high cycle characteristics regardless of the kind of the composite oxide (A) in the cathode active material, as compared with Examples in which other cathode active materials were used. Further, the LIB using the cathode active material of the present invention has a high discharge capacity and a high average voltage even if the proportion of the cathode active material in the cathode active material layer is high. Thus, by using the cathode active material of the present invention, the energy density per volume of the cathode can be made high.

The reason why the LIB using the present active material has improved cycle characteristics and energy density is not clearly understood, but is considered to be due to the effect by covering with the particles (B) and the fluorinated carbon material (C). That is, it is considered as follows. When the particles (B) and the fluorinated carbon material (C) are made to coexist on the surface of the composite oxide (A), the surface of the composite oxide particles and the boundaries between the composite oxide particles can be covered with a high covering ratio (FIGS. 1 and 2).

Further, when the covering ratio of the surface of the composite oxide (A) with the particles (B) and the fluorinated carbon material (C) is high, the surface of the composite oxide exposed to the electrolytic solution may be reduced. As a result, even if the composite oxide expands by swelling by charge and discharge, defects are less likely to appear on the surface of the composite oxide. Thus, the charge and discharge capacity will not be lowered since the composite oxide is not deteriorated, and high cycle characteristics can be achieved.

The effect to reduce expansion of the composite oxide by swelling is usually achieved by the electrically conductive material in the cathode active material. In addition to the functional of the electrically conductive material, the present active material has an effect to reduce expansion of the composite oxide (A) by swelling by covering with the particles (B) and the fluorinated carbon material (C), and accordingly even if the amount of the electrically conductive material is reduced (that is, the proportion of the cathode active material in the cathode active material layer is increased), the effect to reduce expansion of the composite oxide by swelling will sufficiently be achieved. Thus, it is considered that the proportion of the cathode active material in the cathode active material layer can be made high, and as a result, the energy density can be made high.

INDUSTRIAL APPLICABILITY

The present active material is useful as a cathode active material with which a LIB having favorable cycle characteristics and having a high energy density even when discharged at a high voltage can be obtained.

The entire disclosures of Japanese Patent Application No. 2014-099063 filed on May 12, 2014 and Japanese Patent Application No. 2015-076969 filed on Apr. 3, 2015 including specifications, claims, drawings and summaries are incorporated herein by reference in their entireties.

What is claimed is:

1. A cathode active material comprising a composite oxide (A) containing Li and at least one transition metal element selected from the group consisting of Ni, Co and Mn, and the following particles (B) and the following fluorinated carbon material (C) present on the surface of the composite oxide (A):
   particles (B): particles containing an oxide of at least one metal element selected from the group consisting of Ti, Sn, Si, Al, Ce, Y, Zr, and Co; and
   fluorinated carbon material (C): a fluorinated carbon material in the form of particles or fibers,
   wherein the composite oxide (A) is represented by the following formula (I):

$$Li_aNi_xCo_yMn_zMe_bO_2 \qquad (I)$$

wherein $0.95 < a < 1.1$, $0 < x < 1$, $0 < y < 1$, $0 < z < 1$, $0 < b < 0.3$, $0.9 < x+y+z+b < 1.05$, and Me is at least one element selected from the group consisting of Al, Mg, Fe, Cr, Mo, Cu, Zr, Ti, W, V, and Y.

2. The cathode active material according to claim 1, wherein the mass of the particles (B) based on the mass of the composite oxide (A) is from 0.1 to 10%.

3. The cathode active material according to claim 1, wherein the mass of the fluorinated carbon material (C) based on the mass of the composite oxide (A) is from 0.1 to 10%.

4. The cathode active material according to claim 1, wherein the particles (B) are particles containing an oxide of at least one metal element selected from the group consisting of Ti, Sn, Al, Ce and Y.

5. The cathode active material according to claim 1, wherein the average particles size (2) of the following secondary particles of the particles (B) is from 2 to 100 nm, provided that the average particle size (2) is a value calculated from the surface area and the true density of the particles in accordance with the following formula:

average particle size $(2)=6/(\rho Sw)$ wherein $\rho$ (unit: $g/cm^3$) is the true density of particles as measured by a fixed volume expansion method, and Sw (unit: $m^2/g$) is the specific surface area of particles as calculated by a Brunauer, Emmet, Teller method using a nitrogen gas as an adsorption gas.

6. The cathode active material according to claim 1, wherein the fluorinated carbon material (C) is a material obtained by bringing a carbon material in the form of particles or fibers into contact with fluorine ($F_2$).

7. The cathode active material according to claim 1, wherein the fluorinated carbon material (C) is fluorinated Ketjen black or fluorinated activated carbon.

8. A cathode comprising the cathode active material as defined in claim 1.

9. A lithium ion secondary battery having the cathode as defined in claim 8.

* * * * *